Patented June 1, 1926.

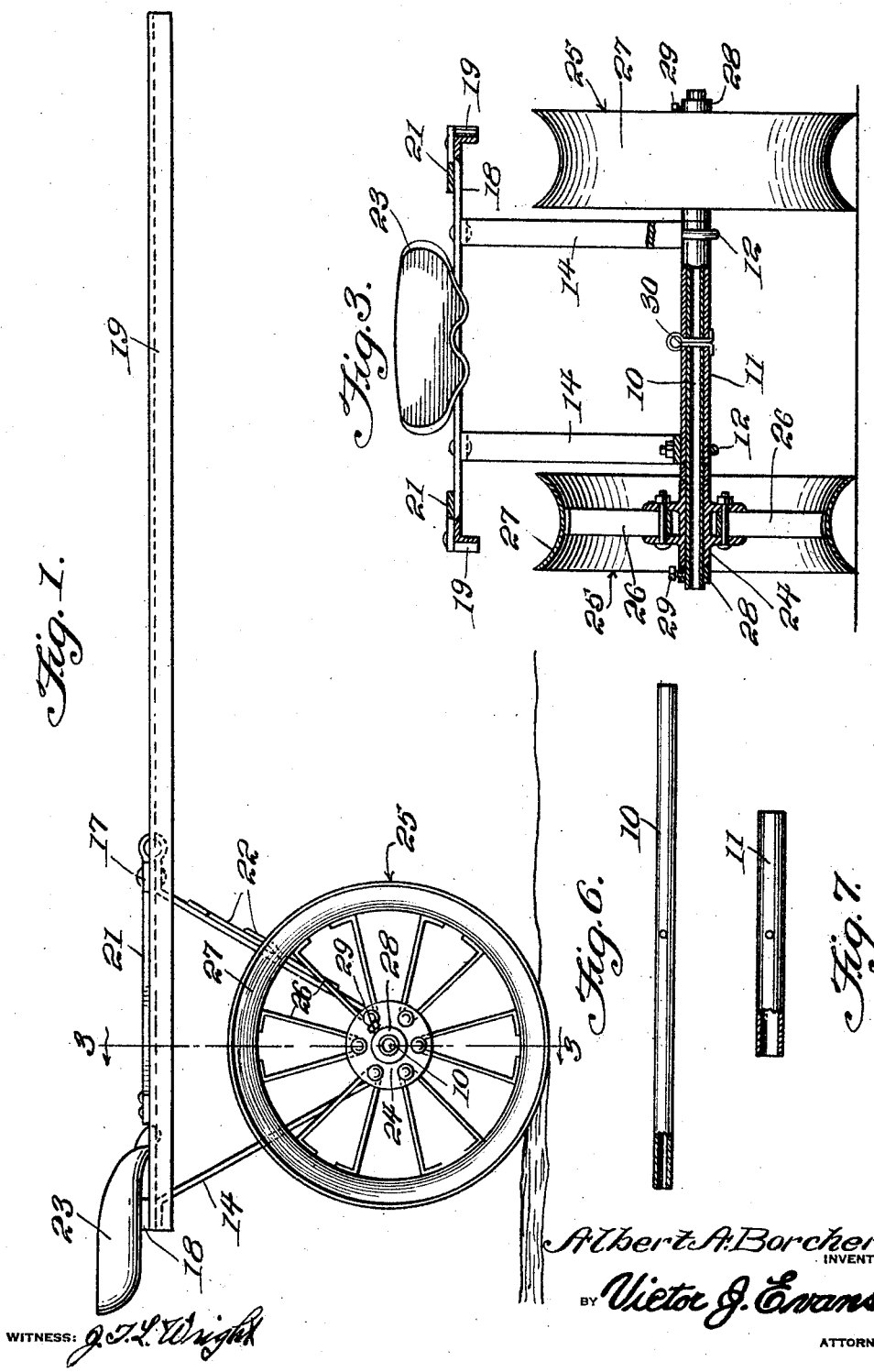

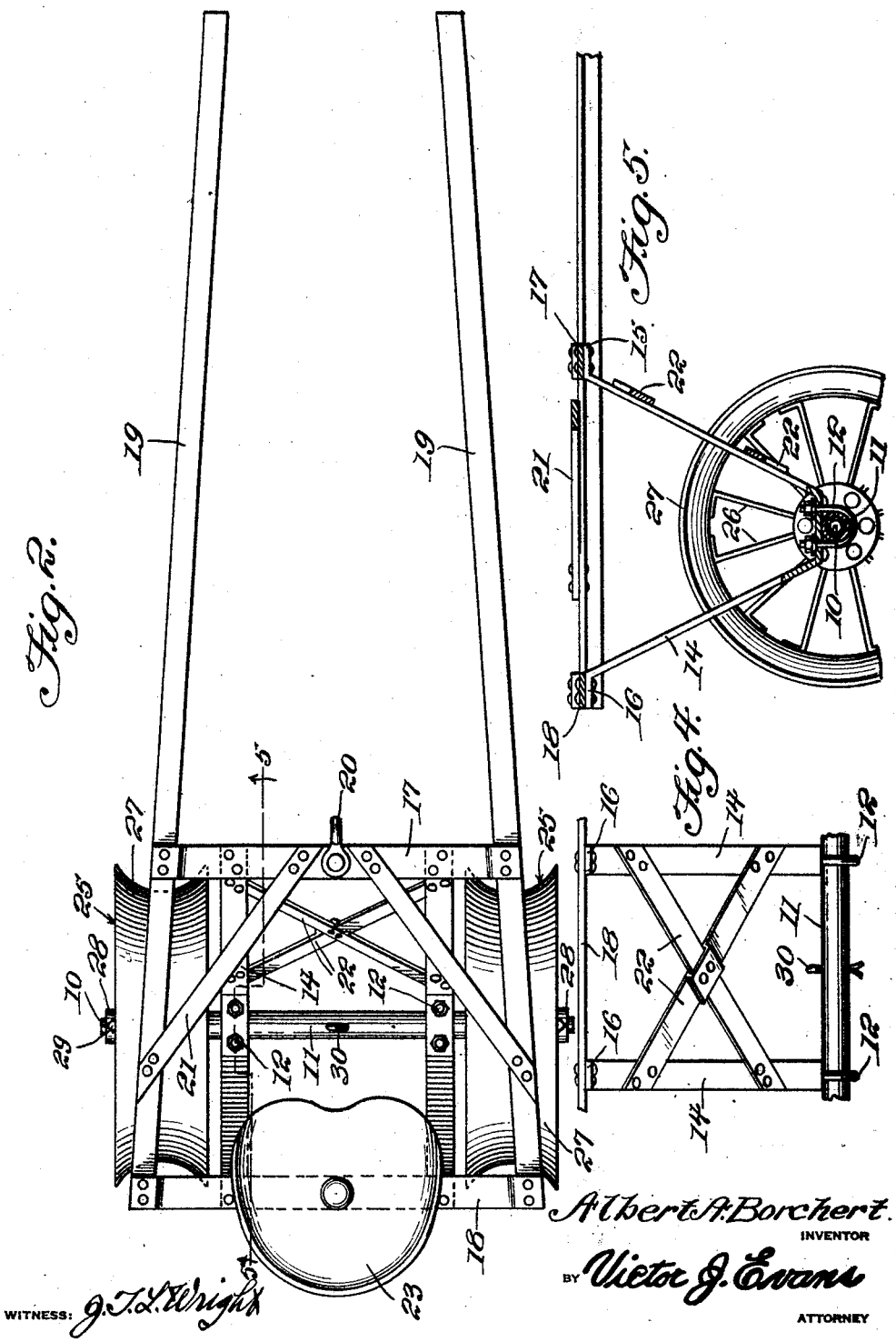

1,587,366

UNITED STATES PATENT OFFICE.

ALBERT A. BORCHERT, OF GUADALUPE, TEXAS.

TRUCK.

Application filed November 12, 1924. Serial No. 749,502.

This invention relates to trucks and has for its object the provision of a device of this character embodying a frame construction of novel formation and extreme simplicity whereby the device will be extremely easy and inexpensive to make, in addition to being positive in action, efficient and durable in service, and a general improvement in the art.

With the above and other objects and advantages in view, the invention consists in the details of construction to be hereinafter more fully described and claimed, and illustrated in the accompanying drawings, in which:—

Figure 1 is a side elevation of the device,

Figure 2 is a top plan view,

Figure 3 is a vertical section on the line 3—3 of Figure 1,

Figure 4 is a fragmentary front elevation,

Figure 5 is a section on the line 5—5 of Fig. 2,

Figure 6 is a detail view of the rotary axle, and

Figure 7 is a detail view of the sleeve mounted thereon.

Referring more particularly to the drawings, the numeral 10 designates a suitable length of pipe upon the intermediate portion of which is mounted a shorter pipe section 11 of somewhat greater diameter, which section 11 is secured, as for instance by means of U-bolts 12 or the like, to the lower ends of a pair of substantially V-shaped side frames 14 which terminate at their upper ends in attaching portions 15 and 16 to which are riveted or otherwise secured to forward and rear cross bars 17 and 18 respectively. Secured to the ends of these cross bars by riveting, welding or the like, are forwardly converging shafts 19 and located at the center of the forward cross bar 17 is a hook or the like 20 adapted for engagement of a single tree therewith whereby a horse may be hitched to the device for pulling it over a field.

In order that the frame structure above described may be braced, I provide forwardly converging diagonal brace members 21 which are secured to the shafts 19 between the forward and rear bars 17 and 18 and which are also secured to the forward cross bar 17 near the central portion thereof. Likewise, I provide a pair of diagonal brace bars 22 which are arranged and secured in crossed relation and which are riveted or otherwise secured to the forward arms of the V-shaped side frames 14.

Suitably secured at the center of the rear cross bar 18 is a seat 23 for the accommodation of the driver.

Owing to the fact that the section 11 is considerably shorter than the pipe section 10, the ends of the latter will project considerably beyond the ends of the former, and mounted upon these projecting ends and rotatable thereon are the hubs 24 of ground engaging wheels 25 which include any suitable spokes 26 and carry rims 27 of considerable width formed concave or arcuate in cross section as clearly shown. These wheels are retained in position upon the axle by means of collars 28 or the like held onto the pipe section 10 by set screws 29. Longitudinal displacement of the pipe sections 10 and 11 with respect to each other may be prevented by means of a large cotter pin 30 or the like passing through both sections and having its ends upset.

In the use of the device, it is obvious that when a horse or other draft animal is hitched between the shafts and the device drawn along the ground, the wheels 27 rolling upon the previously planted rows of seeds will operate to compress the soil over the seeds and consequently close up all cracks, fissures and holes therein so that evaporation of the moisture will be prevented and the soil consequently be kept in better condition for germination of the seeds. Owing to the fact that the wheels have their rims concaved it is evident that the ground will be pressed into a ridge which will act to shed the water to a certain extent so that danger of washing out of the seeds in case of a heavy rain will be avoided.

From the foregoing description and a study of the drawings it will be apparent that I have thus provided a simply constructed, inexpensive and very efficient device for the purpose specified which will perform all the functions for which it is intended in a highly satisfactory manner. Owing to the fewness of the parts and the ruggedness of the construction it is evident that there is very little to get out of order so that the device should have a long and satisfactory life.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:—

In a device of the character described, a frame including a horizontally disposed hollow member, a pair of spaced upstanding V-shaped side frames, U-bolts embracingly engaging said hollow member and secured to said V-shaped side frames, forward and rear cross bars secured to the upper ends of said V-shaped frames, longitudinally extending forwardly converging bars secured to the ends of said cross bars and constituting shafts, diagonal brace members secured to the forward cross bar at points laterally of the center thereof and connected with said longitudinal bars near the rear ends thereof, a seat mounted at the center of the rear cross bar, means mounted at the center of the forward cross bar for attachment of a single-tree thereto, an axle journally mounted through said hollow member and constrained against longitudinal movement with respect thereto, and ground engaging wheels having hub portions rotatably mounted upon said axle and bearing against the outer ends of said hollow member.

In testimony whereof I affix my signature.

ALBERT A. BORCHERT.